Figure 1:
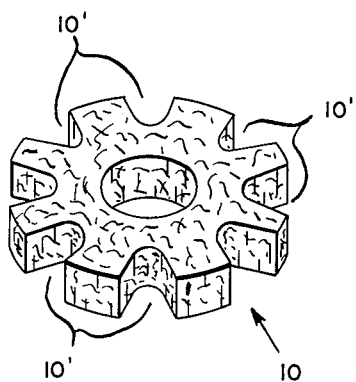

Jan. 11, 1966 T. J. GILLICK, JR., ETAL 3,228,529
FILTER CARTRIDGE
Original Filed May 1, 1959

INVENTORS.
THOMAS J. GILLICK JR.
HAROLD G. HENCKEN
BY ARTHUR G. WROTNOWSKI

*Robertson & Smythe*

ATTORNEYS.

United States Patent Office 3,228,529
Patented Jan. 11, 1966

3,228,529
FILTER CARTRIDGE
Thomas J. Gillick, Jr., Glenville, and Harold G. Hencken and Arthur C. Wrotnowski, Greenwich, Conn., assignors to American Felt Company, Glenville, Conn., a corporation of Massachusetts
Continuation of application Ser. No. 810,457, May 1, 1959. This application Oct. 14, 1963, Ser. No. 315,977
2 Claims. (Cl. 210—457)

This application is a continuation of application Serial No. 810,457, filed May 1, 1959, now abandoned, in the name of Thomas J. Gillick, Jr., Harold G. Hencken and Arthur C. Wrotnowski.

The present invention relates to cartridges for cartridge-type filters and particularly to a new and improved cartridge employing a construction which permits the formation of a compressible seal at each end thereof without disturbing the filtering medium.

Heretofore cartridge-type filters have been constructed of a stack of filter discs or a single cylinder element about a foraminous core and held in place by a thin porous covering or other easily deformable device. Such filter cartridges may be placed within a filter housing of proper size and a cap is usually fastened to the housing in a manner to form a seal between the top of the filter medium and the outlet of the cap and between the bottom of the cartridge and the inlet to the cap. Such seals are usually effected by forcing an annular surface on the cap into engagement with the top of the filter medium compressing the same sufficiently to effect an appropriate sealing action.

Compressing of the filter medium tends to increase its density, reduces the rate of flow of liquid therethrough and increases the differential pressure required to effect the desired filtering action, thereby destroying the efficiency of the filter cartridge. Such compressing of the filtering medium may not materially affect adversely the flow characteristics where the filtering medium is constructed of the usual felt material because such materials do not provide accurate flow characteristics to begin with. This compressing action does, however, become very important where the filtering medium is designed to provide a predetermined filtering capacity such as a mechanically interlocked felt made from monofilament synthetic fibers of predetermined size capable of retaining particles of a known or desired size.

The principal object of this invention is to provide a filter cartridge capable of being effectively sealed between the inlet and outlet of the filter housing with which it is used and without disturbing the filtering medium of the cartridge.

Another object of this invention is to provide such a cartridge in which a standard size cartridge may be employed with an oversized filter housing without affecting the filtering medium.

Another object of the invention is to provide a filter cartridge having a spool made of a foraminous core having rigid discs at each end thereof.

Another object of the invention is to provide a filter cartridge including a filtering medium made from a material having a predeterminable filtration capacity.

Another object of the invention is to provide such a filter cartridge that will operate successfully at exceptional low internal pressure differentials.

In one aspect of the invention, a spool-like member may include end disc means that are joined by a foraminous or perforated sleeve. Felt filtering discs or a felt cylinder may be located between the disc means and surrounding the foraminous core.

It has been found that superior filtration results can be achieved with a felt filtering medium made from synthetic fibers, particularly of the monofilament type. Since it is possible to obtain synthetic fibers in a wide range of accurately sized fiber diameters or deniers, it is possible to provide a filtering felt made from such fibers to control accurately the size of pores so that a predetermined size of particles can be filtered out. Preferably, the felt made from such fibers should be mechanically interlocked by subjecting the batt to a needling operation. This operation may be performed by passing barbed needle means repeatedly through the thickness of the batt in such a manner as to cause the fibers to move in a depthwise direction or transversely of the layers of fibers of the bat. These depthwise or transversely disposed fibers occasioned by the needling process will lie substantially perpendicular to the longitudinal broad faces of the batt. When the barbed needles are withdrawn from the batt, the transversely disposed fibers will remain in their depthwise transverse position, producing a mechanical interlocking of the fibers. This mechanical interlocking may be achieved by subjecting either or both sides of the batt to the needling treatment. Other types of felt can be used.

In still another aspect of the invention, filtering discs made from such a mechanically interlocked fiber felt, whether of synthetic fibers or natural fibers or a mixture of each, may be located between the end disc means on the foraminous core. Gasket means may be located on the outer faces of each disc means for forming a seal between the cap and the inner bottom of the filter housing. In this way sufficient compressing force may be applied to the gaskets to form adequate seals, and still the filtering medium will not be compressed or have its flow characteristics affected by such compressing action. Furthermore, these gaskets may be of varying thickness so that a smaller cartridge may be employed effectively with a larger filter housing.

The above, other objects and novel features of the improved filter cartridge will become apparent from the following specification and accompanying drawing which is merely exemplary.

Figure 2:
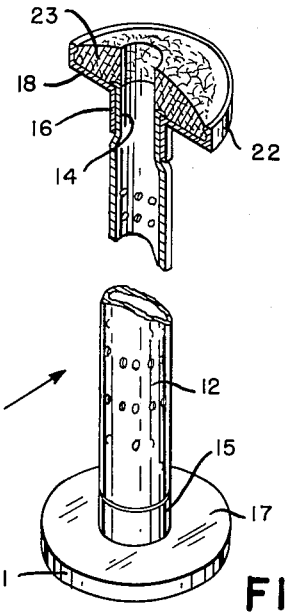
Figure 4:
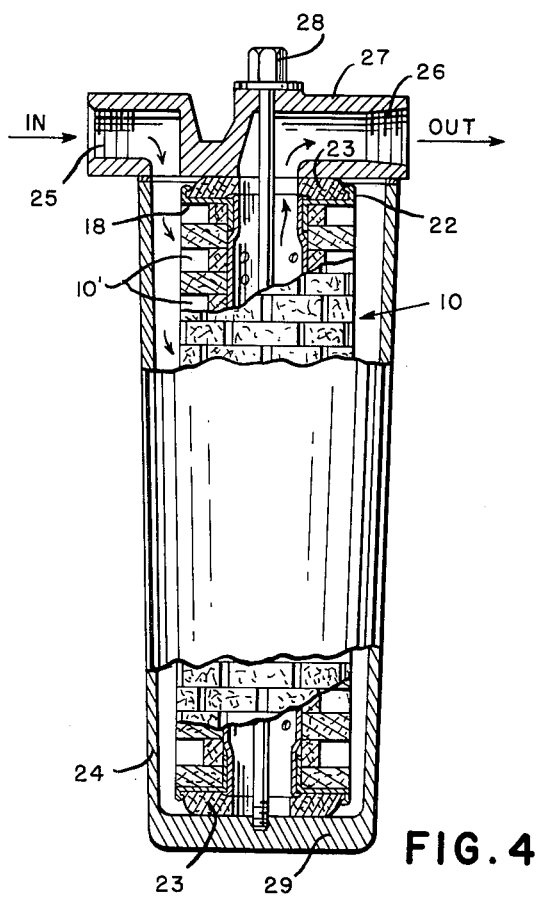
Figure 3:
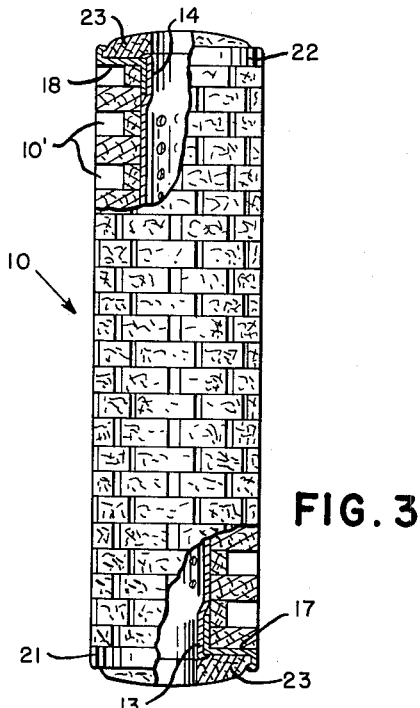

In the drawing:
FIG. 1 is a perspective view of a felt filter disc made of mechanically interlocked monofilament fibers for use in a filter cartridge embodying the principles of the invention;
FIG. 2 is a perspective view of a spool for supporting the discs of FIG. 1;
FIG. 3 is a filter cartridge to which the principles of the invention have been applied; and
FIG. 4 is a filter housing loaded with the cartridge shown in FIG. 3.

Referring to FIG. 1, a filter disc 10 may be made from felt, and it may include recesses 10' about its periphery to increase the effective filtering area. It has been found that superior results can be achieved if the felt disc 10 is made from mechanically interlocked felted synthetic fibers. It will be understood that various combinations of synthetic fibers may be used and that synthetic fibers may be mixed with a minor amount of natural fibers and yet obtain many of the advantages of using synthetic fibers alone.

"Mechanically interlocked" is used herein to mean interlocking the fibers by needling or other similar mechanical processes in which the fibers are mechanically carried depthwise through the felt batt from which they are made. A batt, which can be referred to as a "carded batt," is prepared on a textile carding machine as is known in the manufacture of felt, such providing a plurality of layers of fibers. A plurality of barbed needles are arranged and operated so as to penetrate the thickness of the batt in such a manner as to cause fibers to move in a depthwise direction or across the layers of fiber of the batt. As the needles are withdrawn, the fibers will remain in their depthwise position where they have been carried so as to produce a mechanically interlocked felt. Both sides of the batt can be subjected to the needling treatment a plurality of times.

By employing synthetic fibers, particularly of the monofilament type, the construction will be uniform and it is possible to control accurately the size of pores so that a predetermined size of particles can be filtered out. It is possible to obtain synthetic fibers in a wide range of accurately sized fiber diameters or deniers, such as not obtainable in natural fibers. The preferred form will use monofilament fibers of one denier. The filter cartridge of the present invention has been found to have a very high solids capacity while at the same time maintaining very low pressure differential when in use, and can be designed with fibers of predetermined size to effectively retain particles of a known or desired size.

Referring to FIG. 2, the spool means 11 may include a foraminous tube-like core 12 made from a foraminous paper, metal or other suitable perforated material. The ends of the core 12 may be necked in at 13 and 14 for receiving the collars 15 and 16 of the spool ends 17 and 18. After the spool ends 17 and 18 are in place, the outer ends of the necked-in portions 13 and 14 may be spun outwardly to the original diameter of the core 12, thereby effectively locking the spool ends 17 and 18 to the ends of the core 12.

During assembly, the one disc means 17 may be left off until sufficient of the discs 10 have been loaded onto the foraminous core 12. The end disc means 17 may then be applied either permanently by spinning outwardly the core 12, or by a friction fit so that loaded filter discs may be replaced with facility.

Referring again to FIG. 2, the spool ends 17 and 18 may be provided with flanges 21 and 22 extending outwardly and forming outwardly facing pockets in each spool end, for the reception of disc-like gaskets 23. The gaskets 23 may be made of any kind of felt and may be held in place within said pockets preferably by rolling the edge of the flanges 21 and 22 into the gasket material, although other means such as adhesives may be employed.

Referring to FIG. 4, an assembled cartridge is shown mounted within a filter housing 24 having an inlet 25 and an outlet 26. The inlet and outlet are formed in a removable cap 27 adapted to be held in sealing relation with the gasket 23 and the outer top edge of housing 24 by a headed bolt 28 that extends downwardly through the core 12 and is threaded into the base 29 of the housing 24.

By providing gaskets 23 of different thickness, it is evident that a standard cartridge may be employed with filter housings 24 of varying length. As the liquid to be filtered passes through the inlet 25, it fills the annular space between the cartridge and the housing 24. The liquid then passes through the felt discs 10, thence through the foraminous core 12 and finally out the outlet 26.

From the foregoing it is evident that the compressing force applied to the gaskets 23 in order to provide adequate seals at the top and bottom of the cartridge is not transferred to the discs 10 between the ends 17 and 18 and, consequently, the density of the synthetic fiber felt is unaltered so that uniform filtering is effected with a minimum differential pressure between the inlet and the outlet.

Furthermore, gaskets 23 of any desired thickness may be used to facilitate the use of a standard size cartridge in an oversized filter housing, and the compressing force necessary to establish a proper seal between the cap and cartridge is not transferred to the filter medium about the foraminous core 12.

Although the various features of the new and improved filter cartridge have been shown and described in detail to fully disclose one embodiment of the invention, it will be evident that numerous changes may be made in such details and certain features may be used without others without departing from the principles of the invention.

What is claimed is:

1. A cartridge for a cartridge-type filter having a container and a cover therefor, the combination including a formainous core having rigid annular spool end members fixed at each end thereof, said core having its opposite ends necked to form end portions of reduced diameter, said rigid annular spool end members having inwardly directed collar means adapted to engage said necked end portions, the ends of said necked end portions being displaced to the original diameter of said core to thereby hold said end members and core together, said necked end portions being a predetermined distance apart so as to hold said rigid annular spool end members in spaced relation; axially outwardly directed flanges surrounding the outer periphery of and integral with said annular spool end members; a filtering medium between said annular spool end members and surrounding said core, said filtering medium being of felt having as a major portion thereof, synthetic fibers, some of said fibers being mechanically interlocked with others; and compressible gasket means on the exterior faces of said annular spool end members extending axially beyond and restrained against radial expansion by said outwardly directed flanges when pressure is applied thereto by assembling the cover to said container.

2. A cartridge for a cartridge-type filter having a container and a cover therefor, the combination including a foraminous core having rigid annular spool end members fixed at each end thereof, said core having its opposite ends necked to form end portions of reduced diameter, said rigid annular spool end members having inwardly directed collar means adapted to engage said necked end portions, the ends of said necked end portions being displaced to the original diameter of said core to thereby hold said annular spool end members and core together, said necked end portions being a predetermined distance apart so as to hold said rigid annular spool end members in spaced relation; a filtering medium between said end members and surrounding said core, said filtering medium being of felt having monofilament synthetic fibers of one denier, as a major portion thereof, some of said fibers being mechanically interlocked with others; and axially outwardly directed flanges surrounding the outer periphery of and integral with said annular spool end members for supporting a selected gasket of a desired thickness, and such that it extends axially beyond and is restrained against radial expansion by said outwardly directed flanges when pressure is applied thereto by assembling the cover to said container.

References Cited by the Examiner

UNITED STATES PATENTS

| 2,550,070 | 4/1951 | La Brecque et al. | 210—457 X |
| 2,822,201 | 2/1958 | Wood | 210—457 X |
| 3,064,820 | 11/1962 | Gillick et al. | 210—488 |

REUBEN FRIEDMAN, *Primary Examiner.*